(12) United States Patent
Rizzo (10) Patent No.: US 8,756,098 B1
(45) Date of Patent: Jun. 17, 2014

(54) EVALUATING MONEY MANAGERS BASED ON ABILITY TO OUTPERFORM INDEXES AND PEERS

(71) Applicant: Morgan Stanley Smith Barney LLC, Purchase, NY (US)

(72) Inventor: Matthew Rizzo, Media, PA (US)

(73) Assignee: Morgan Stanley Smith Barney LLC, Purchase, NY (US)

( * ) Notice: Subject to any disclaimer, the term of this patent is extended or adjusted under 35 U.S.C. 154(b) by 0 days.

(21) Appl. No.: 14/028,132

(22) Filed: Sep. 16, 2013

(51) Int. Cl.
*G06Q 10/10* (2012.01)

(52) U.S. Cl.
USPC ........................................ 705/7.38; 705/7.39

(58) Field of Classification Search
CPC .................................................. G06Q 10/0639
USPC ................................................. 705/7.38, 7.39
See application file for complete search history.

(56) References Cited

U.S. PATENT DOCUMENTS

| | | | | |
|---|---|---|---|---|
| 5,132,899 | A * | 7/1992 | Fox ............................... | 705/36 R |
| 6,338,047 | B1 * | 1/2002 | Wallman ...................... | 705/36 R |
| 6,952,678 | B2 * | 10/2005 | Williams et al. .............. | 705/320 |
| 7,031,938 | B2 * | 4/2006 | Fraivillig et al. ........... | 705/36 R |
| 7,149,716 | B2 * | 12/2006 | Gatto ........................... | 705/36 R |
| 7,509,274 | B2 | 3/2009 | Kam et al. | |
| 7,509,277 | B1 * | 3/2009 | Gatto ........................... | 705/36 R |
| 7,539,637 | B2 * | 5/2009 | Gatto ........................... | 705/36 R |
| 7,603,308 | B2 * | 10/2009 | Gatto ........................... | 705/36 R |
| 7,610,230 | B2 * | 10/2009 | Festog et al. ................. | 705/36 R |
| 7,644,011 | B2 * | 1/2010 | Shkedy ......................... | 705/7.38 |
| 7,707,092 | B1 * | 4/2010 | Freed ........................... | 705/36 R |
| 7,711,623 | B2 * | 5/2010 | Smith et al. .................. | 705/36 R |
| 7,756,738 | B2 * | 7/2010 | Jacobs .......................... | 705/7.42 |
| 7,797,183 | B2 * | 9/2010 | Dias et al. .................... | 705/7.39 |
| 7,941,359 | B2 * | 5/2011 | Tanner .......................... | 705/37 |
| 2002/0019766 | A1 * | 2/2002 | Higashi et al. ................ | 705/11 |
| 2002/0035506 | A1 * | 3/2002 | Loya ............................. | 705/14 |
| 2002/0077946 | A1 * | 6/2002 | Caplan et al. ................ | 705/36 |
| 2003/0046209 | A1 * | 3/2003 | Brandenberger et al. ...... | 705/36 |
| 2004/0111350 | A1 * | 6/2004 | Charnley, Jr. ................ | 705/36 |

(Continued)

FOREIGN PATENT DOCUMENTS

WO  WO 2010/056928 A2 *  5/2010  ............ G06Q 40/00

OTHER PUBLICATIONS

Lakonishok, Josef et al., The Structure and Performance of the Money Management Industry Brookings Papers on Economic Activity, Microeconomics, 1992.*

(Continued)

*Primary Examiner* — Scott L Jarrett
(74) *Attorney, Agent, or Firm* — K&L Gates LLP (57) ABSTRACT

Computer-based systems and method are disclosed for grading active money managers. The grading system attempts to identify active money managers with the ability to outperform relevant benchmark indexes and peer active money managers. This may be accomplished by using a point system for calendar years (or other time periods) that awards points based on the degree of difficulty for active money managers to outperform their relevant benchmark index during the calendar year for their investing style. The yearly point total are used to determine a baseline point total, and the money managers are award fractions of the baseline point total based on, for example, (i) how close the money manager's investments match constituents of the money manager's benchmark, and (ii) how close the money manager's return is to the benchmark for the money manager.

24 Claims, 9 Drawing Sheets

(56) References Cited

U.S. PATENT DOCUMENTS

| | | | |
|---|---|---|---|
| 2004/0117286 A1* | 6/2004 | Charnley, Jr. | 705/36 |
| 2004/0210550 A1* | 10/2004 | Williams et al. | 707/1 |
| 2004/0225586 A1* | 11/2004 | Woods et al. | 705/35 |
| 2004/0249687 A1* | 12/2004 | Lowell et al. | 705/7 |
| 2005/0080695 A1* | 4/2005 | Gatto | 705/35 |
| 2005/0234796 A1* | 10/2005 | Lipper, III | 705/36 |
| 2006/0010032 A1* | 1/2006 | Eicher et al. | 705/10 |
| 2006/0074785 A1* | 4/2006 | Festog et al. | 705/35 |
| 2006/0100946 A1* | 5/2006 | Kazarian | 705/35 |
| 2007/0022001 A1* | 1/2007 | Jacobs | 705/11 |
| 2007/0198331 A1 | 8/2007 | Hurley et al. | |
| 2007/0276746 A1* | 11/2007 | Michonski | 705/37 |
| 2007/0294119 A1* | 12/2007 | Eicher et al. | 705/7 |
| 2008/0040250 A1* | 2/2008 | Salter | 705/36 R |
| 2008/0243714 A1* | 10/2008 | Hassett | 705/36 R |
| 2008/0294504 A1* | 11/2008 | Mortensen et al. | 705/11 |
| 2008/0313071 A1* | 12/2008 | Hughes et al. | 705/37 |
| 2010/0023384 A1* | 1/2010 | Pollard et al. | 705/11 |
| 2011/0119116 A1* | 5/2011 | Gatto et al. | 705/7.39 |
| 2011/0196773 A1* | 8/2011 | Fatica et al. | 705/37 |
| 2012/0005113 A1* | 1/2012 | Kotis | 705/321 |
| 2013/0073351 A1* | 3/2013 | Bair et al. | 705/14.1 |

OTHER PUBLICATIONS

Morningstar Manager Benchmarks—Morningstar Methology Paper Morningstar, Inc., Oct. 2010.*

The Scorecard System—Comprehensive Fund Evaluation Epstein Financial Retirement Plan Advisory Group, 2009.*

Asset Manager Rating Criteria—Master Criteria Report FitchRatings, Fun and Asset Manager Rating Group, Apr. 22, 2013.*

Brown, Keith C. et al., Investment Style Volatility and Mutual Fund Performance McCombs School of Busienss, University of Texas, Jan. 20, 2011.*

Chan, Louis K. et al., Benchmarking money manager performance: Issues and evidence Aug. 2006.*

Rizzo, Matthew, "Factors Affecting Active Manager Performance", Consulting Group Investment Advisor Research, May 1, 2012, Morgan Stanley Smith Barney LLC, pp. 1-20.

Asset Manager Rating Criteria, Master Criteria Report, FitchRatings, Fund & Asset Manager Rating Group, Asset Managers/Global, Apr. 22, 2013, pp. 1-16.

The Science and Art of Manager Selection, Manager Research at Barclays, White Paper, Wealth and Investment Management, Global Research and Investments, Mar. 2012, 26 pages.

* cited by examiner

| Year | Large/Multi Cap Growth | Large/Multi Cap Value | Small/Mid Cap | Int'l & Emerging |
|---|---|---|---|---|
| 1994 | 6 | 2 | 2 | 4 |
| 1995 | 6 | 10 | 7 | 3 |
| 1996 | 9 | 7 | 7 | 6 |
| 1997 | 4 | 9 | 6 | 3 |
| 1998 | 13 | 8 | 6 | 8 |
| 1999 | 12 | 6 | 6 | 6 |
| 2000 | 2 | 2 | 3 | 2 |
| 2001 | 2 | 2 | 5 | 2 |
| 2002 | 4 | 5 | 6 | 3 |
| 2003 | 4 | 3 | 9 | 7 |
| 2004 | 2 | 5 | 7 | 4 |
| 2005 | 2 | 3 | 4 | 2 |
| 2006 | 3 | 10 | 7 | 5 |
| 2007 | 6 | 4 | 4 | 7 |
| 2008 | 4 | 5 | 10 | 3 |
| 2009 | 10 | 3 | 3 | 7 |
| 2010 | 9 | 6 | 5 | 6 |
| 2011 | 14 | 6 | 8 | 6 |
| 2012 | 5 | 10 | 11 | 5 |

EVALUATING MONEY MANAGERS BASED ON ABILITY TO OUTPERFORM INDEXES AND PEERS

FIELD OF THE INVENTION

The present invention relates generally to grading active money managers based on their ability to outperform relevant indexes and peer active money managers on a going forward basis.

BACKGROUND

In the field of financial investing, a "money manager" is an entity (e.g., person or business) that is responsible for managing the securities portfolio of an individual or institutional investor. "Active management" refers to a portfolio management strategy where the manager makes specific investments with the goal of outperforming an investment benchmark index. "Alpha" is a risk-adjusted measure for the active return of an investment portfolio. It is the return in excess of the compensation for the risk borne, and thus commonly used to assess active managers' performances.

Many factors can affect the relative performance of active money managers over time. These factors include the correlation of stocks within an index, stock market volatility, the relative returns of large and small stocks, relative valuations of growth and value stocks, and the distribution of individual stock returns within a given index. Sometimes active managers can face adverse environments even though the markets may be up in general. This is because there may be some periods where active management does not perform well relative to the appropriate benchmark index, even though markets are up in those periods.

SUMMARY

In one general aspect, the present invention is directed to computer-based systems and methods for computing a ranking or grade for active money managers that is indicative of the money managers' likelihood of achieving success going forward; that is, identify active money managers with the ability to outperform relevant benchmark indexes as well as peer active money managers on a forward going basis. This is accomplished, in various embodiments, by using a point system for calendar years (or other time periods if so desired) that awards points based on the degree of difficulty for active money managers to outperform their relevant benchmark index during the calendar year for their investing style (or category, such as large or small/mid cap, value or growth, international, etc.). The yearly point totals are used to determine a baseline point total, and the money managers are award fractions of the baseline point total based on, for example, (i) how close the money manager's investments match constituents of the money manager's benchmark index, e.g., the money manager's active share score, and (ii) how close the money manager's return is to the benchmark index for the money manager, e.g., the money manager's tracking error score. In particular, the money managers may grade highly if they have both a high active share score and a low tracking error score. Such a combination can point toward managers with good stock-picking skills. The money managers' grades can then be used as a factor (along with other potential factors) by an investor in determining with which money manager(s) to invest.

These and other benefits of the present invention will be apparent from the description that follows.

FIGURES

Various embodiments of the present invention are described herein by way of example in conjunction with the following figures, wherein.

DESCRIPTION

Various embodiments of the present invention are directed to computer-based systems and methods for ranking money managers, in particular active money managers. Ratings and/or grades for the money managers are computed, where the ratings/grades are indicative of the money managers' ability to outperform peers and relevant benchmark indexes going forward. In particular, the ratings/grades are based on the active money managers' ability to achieve alpha in adverse active management markets and can be used to identify money managers with ability to outperform in the future. In that sense, the invention can be generally though of as an "adverse, active, alpha" (AAA) manager ranking system.

Figure 1:
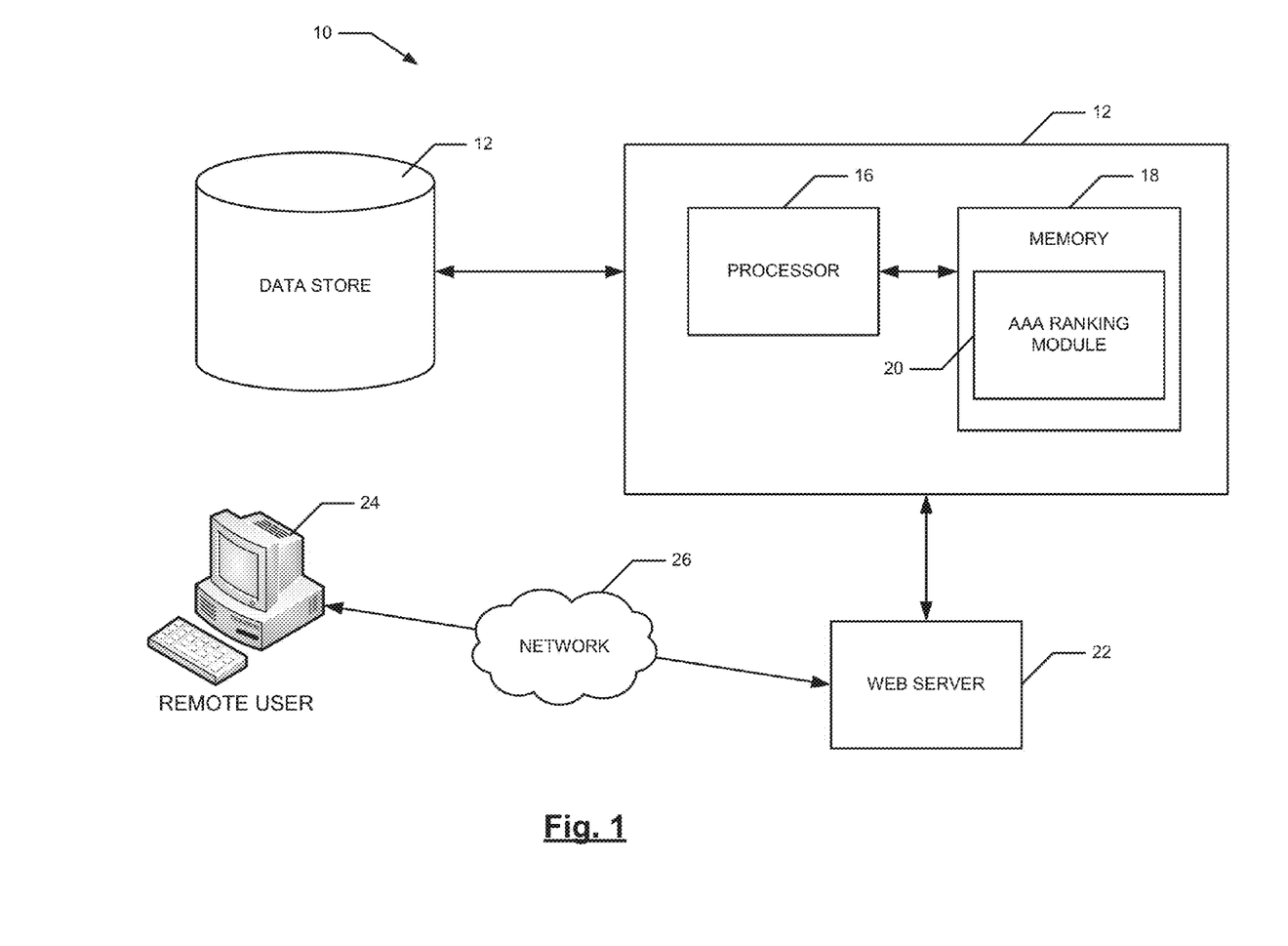
FIG. 1 is block diagram of a computer system according to various embodiments of the present invention.

FIG. 1 is a block diagram of a computer system 10 for computing a ranking of money managers according to various embodiments of the present invention. As shown in FIG. 1, the system 10 may comprise a computer-based data store 12 and a computer device 14. The data store 12 stores data related to the active money managers being graded and ranked. The data stored in the data store 12 can include, for each of the active money managers, their holdings and their returns over the prior time period. The data can be obtained from any reliable source or sources, such as Morningstar Direct, CBOE, FactSet, or any other sources.

As described below, the managers' grades may be computed based on their performance over multiple time periods, which could be years, quarters, months, etc.—whatever time period is deemed appropriate for the application and for which there is reliable, available data. Thus, for example, if calendar years are used, the data store 12 may store, for a particular money manager: his/her holdings at the end of the first year (or holdings at various times throughout the year); his/her return for the first year; his/her holdings at the end of the second year; his/her return for the second year; and so on for other years where such data is available for the manager. The description to follow uses calendar years as the time periods for example sake, recognizing as mentioned above the invention is not so limited and that other time periods could be used.

The computer device 14 computes the grades and ranking for the money managers based on the data stored in the data store 12. The computer device 14 may be implemented as one or more networked computer devices, such as one or more networked servers, personal computers, mainframe computers, workstations, laptop computers, etc. As a computer device, it may comprise one or more processor circuits 16 and one or more memory units 18, although for simplicity, only one such processor circuit 16 (labeled "processor" in FIG. 1) and one such memory unit 18 (labeled "memory" in FIG. 1). The memory 18 may store software that is executed by the processor 16. In particular, the memory 18 stores an adverse active alpha (AAA) ranking software module 20 that, when executed by the processor 16, causes the processor to compute the grades and ranking for the money managers as described below.

The data storage system 12 may comprise a number of data stores, which may be implemented as computer databases, data files, directories, or any other suitable system for storing data for use by computers. The data storage system 12 may be embodied as solid state memory (e.g., ROM), hard disk drive systems, RAID, disk arrays, storage area networks (SANs), and/or any other suitable system for storing computer data. In addition, the data storage system 12 may comprise caches, including web caches and database caches. The data storage system 12 may be part of the computer device(s) 14 or connected to the computer device(s) 14 via a network connection (e.g., a LAN).

The computer system 10 may also include one or more web servers 22 in communication with the computer 14. The web server 22 may host web sites accessible by a remote user 24, via an electronic data communication network 26. The network 26 may comprise one or more LANs, WANs, the Internet, and/or an extranet, or any other suitable data communication network allowing communication between computer systems, with wired and/or wireless links. The remote user 24 may, for example, download or otherwise receive the money manager grades and/or rankings computed by the computer system 14 via a web site hosted by the web server 22.

Before describing example processes of the present invention, an explanation of benchmark indexes may be appropriate. In various embodiments of the present invention, the money managers' grades and ranking are computed differently depending on the manager's investing style or category. In various embodiments, the investing styles/categories are categorized into several different styles/categories:

1) Large cap value
2) Large cap growth
3) Large cap core
4) Multi cap value
5) Multi cap growth
6) Multi cap core
7) Small cap value
8) Small cap growth
9) Small cap core
10) Mid cap growth
11) Mid cap value
12) Mid cap growth
13) International and
14) Emerging market Of course in other embodiments, a different number of styles/categories could be used (such as smid categories). In any event, a benchmark index is selected for each category, and the money managers' performances are graded, in part, relative to the applicable benchmark index for the manager's investing style. In various embodiments, the benchmark indexes that are used are:

TABLE 1

| Investing Style/Category | Benchmark Index |
| --- | --- |
| Large cap value | Russell 1000 Value |
| Multi cap value | Russell 3000 Value |
| Large Cap Core | Russell 1000 |
| Large cap growth | Russell 1000 Growth |
| Multi cap growth | Russell 3000 Growth |
| Multi cap core | Russell 3000 |
| Small cap value | Russell 2000 Value |
| Small cap growth | Russell 2000 Growth |
| Small cap core | Russell 2000 |
| Mid cap value | Russell Mid Cap Value |
| Mid cap growth | Russell Mid Cap Growth |
| Mid cap core | Russell Mid Cap |
| International | MSCI All Country World Index (ACWI) Ex-US |
| Emerging Market | MSCI Emerging Markets Index |

Of course, in other embodiments different benchmark indexes could be used.

Figure 2:
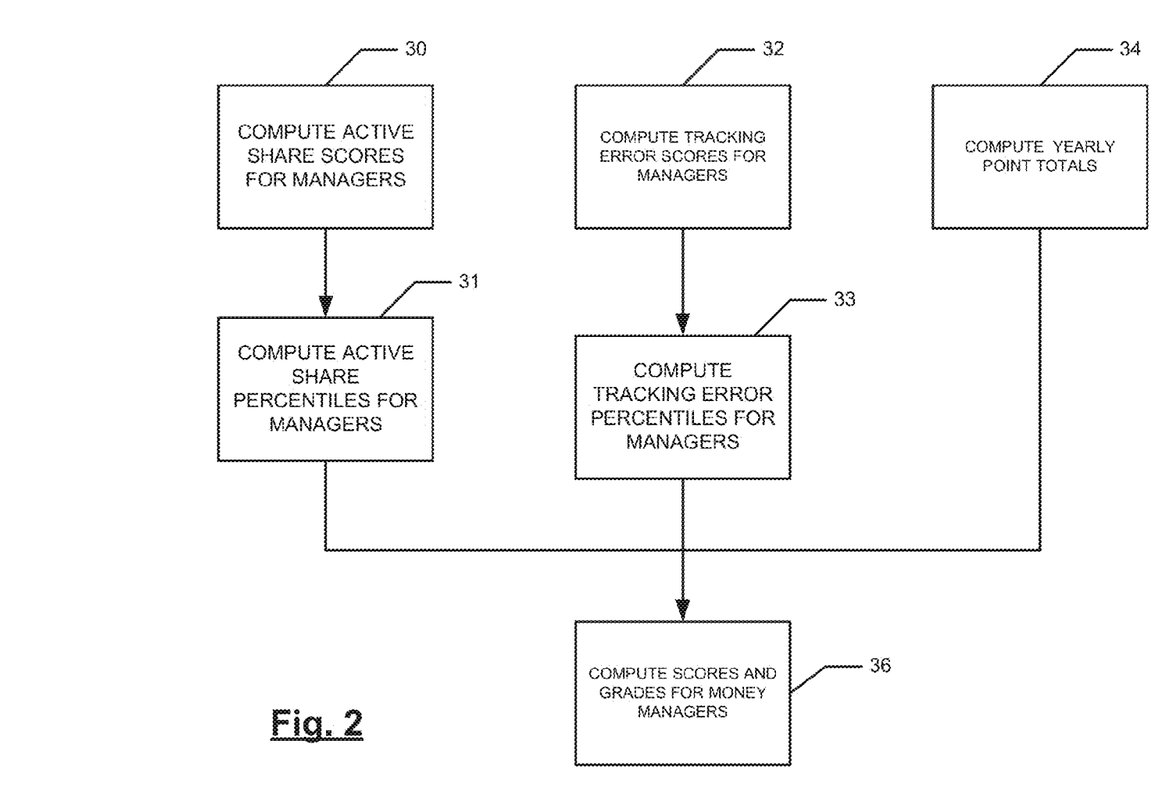
FIG. 2 is diagram of a process flow performed by the computer system of FIG. 1 to compute the money managers' scores according to various embodiments of the present invention.

FIGS. 2-5 illustrate a process for computing the money manager AAA grades and rankings according to various embodiments of the present invention. The illustrated processes may be performed by the computer device 14; in particular, they may be performed by the processor 16 when executing the code of the AAA ranking module 20. As shown in FIG. 2, the process of computing the money manager AAA grades and rankings includes the step (step 30) of computing the active share score for each money manager in the study. The active share calculation sums the absolute values of each money manager's portfolio holding weight minus the benchmark weight, and divides by two. That is, for a particular money manager, for each individual stock i=1, . . . , N held by either the money manager or the benchmark fund, the money manager's active share score may be computed as:

$$ActiveShare = \frac{1}{2}\sum_{i=1}^{N} |weight_{fund,i} - weight_{index,i}|$$

where $weight_{fund, i}$ is the fund's weighting for stock i and $weight_{index, i}$ is the benchmark index's weight for stock i. A fund's weighting for stock i may be computed as the fund's holdings of stock i relative to the entirety of the fund's holdings. Benchmark indexes typically weight their constituent stocks proportionally to market capitalization. In other embodiments, some other metric besides active share that is indicative of how closely the money manager's investments match the constituents of the money manager's relevant benchmark could be used. Next, at step 31 the percentiles for the money managers in terms of active share are computed. For example, the money managers are ranked in descending order (because higher active share score is better in this grading model) so that the money managers' corresponding active share score percentiles can be computed.

At step 32, a tracking error score is computed for the money managers in the study. Tracking error in general is a metric that measures how closely the return of a portfolio follows the return of its benchmark index. For example, a money manager's monthly tracking error (TE) could be computed as $$TR = \sqrt{\frac{1}{T-1}\sum_{t=1}^{T}(e_t - \bar{e})^2}$$

$e_t$ is the excess return for month t, $\bar{e}$ is the average geometric excess return, and T is the number of months over which the tracking error is tracked. In various embodiments, a three-year (or 36 month) tracking error is used. The money manager's annualized tracking error may then be computer as $$TE_A = TE \times \sqrt{n}$$

where n is the periods in a year. In various embodiments, the managers' three-year tracking error is used. In other embodiments, some other metric besides tracking error that is indicative of how closely the money manager's return is to the money manager's relevant benchmark could be used. Next, at step 33 the percentiles for the money managers in terms of tracking error are computed. For example, the money managers are ranked in ascending order (because is lower tracking error is better in this grading model) so that the money managers' corresponding tracking error score percentiles can be computed. The money managers' active share and tracking error scores (steps 30 and 32) can be computed based on the data stored in the data store 12.

Figure 3A:
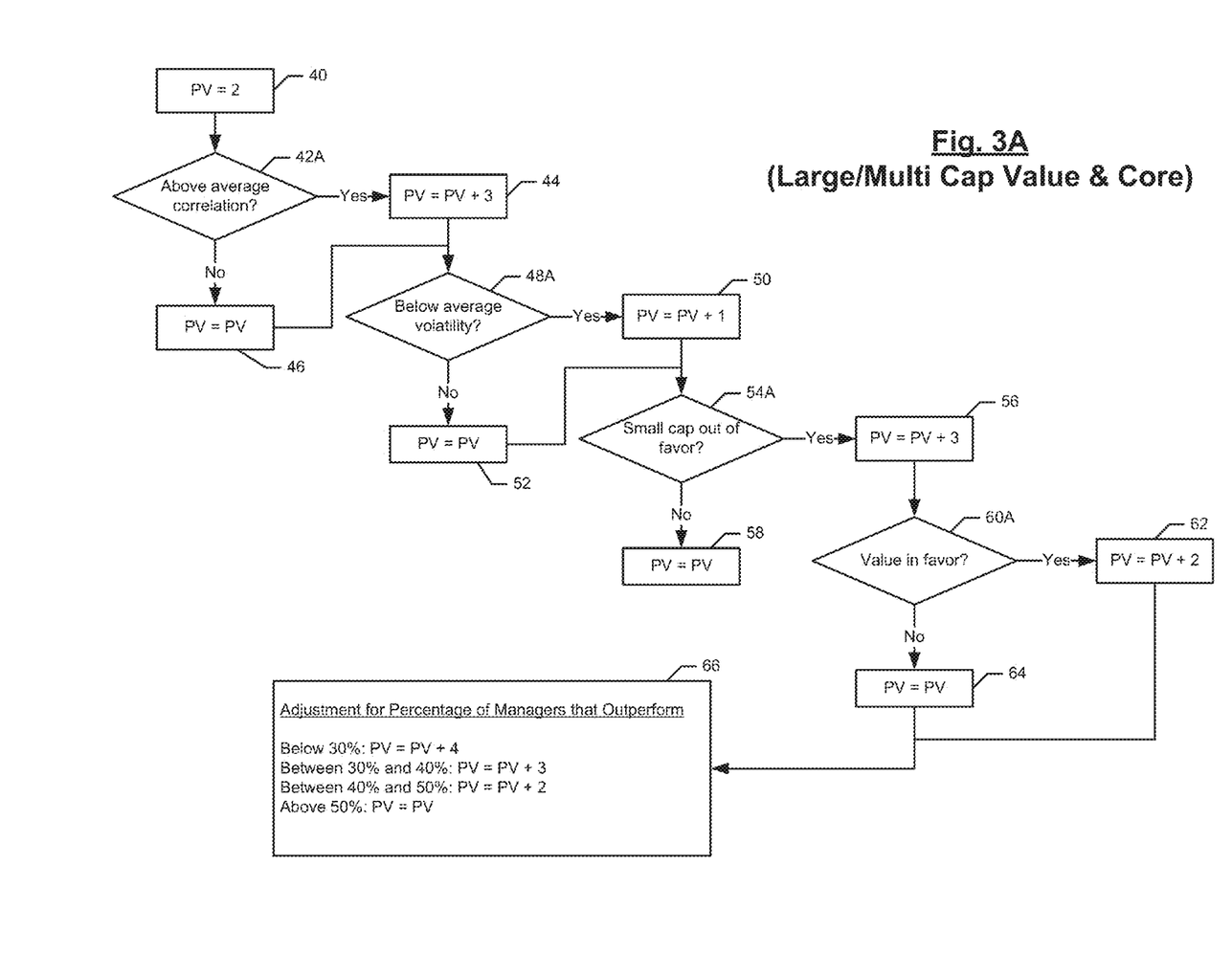
FIGS. 3A-D illustrate process flows for computing the yearly point totals for different investing styles according to various embodiments of the present invention.
Figure 3B:
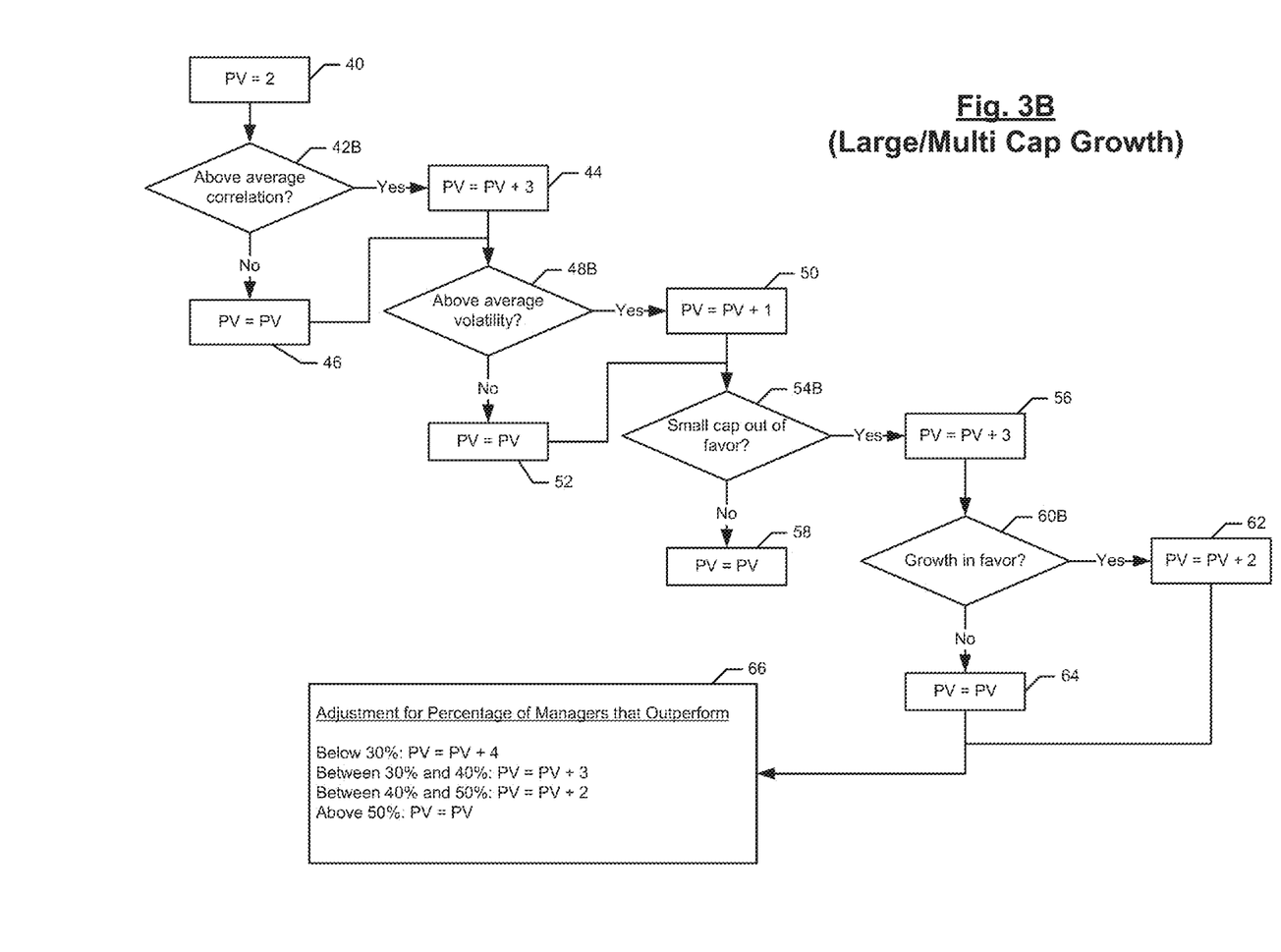
Figure 3C:
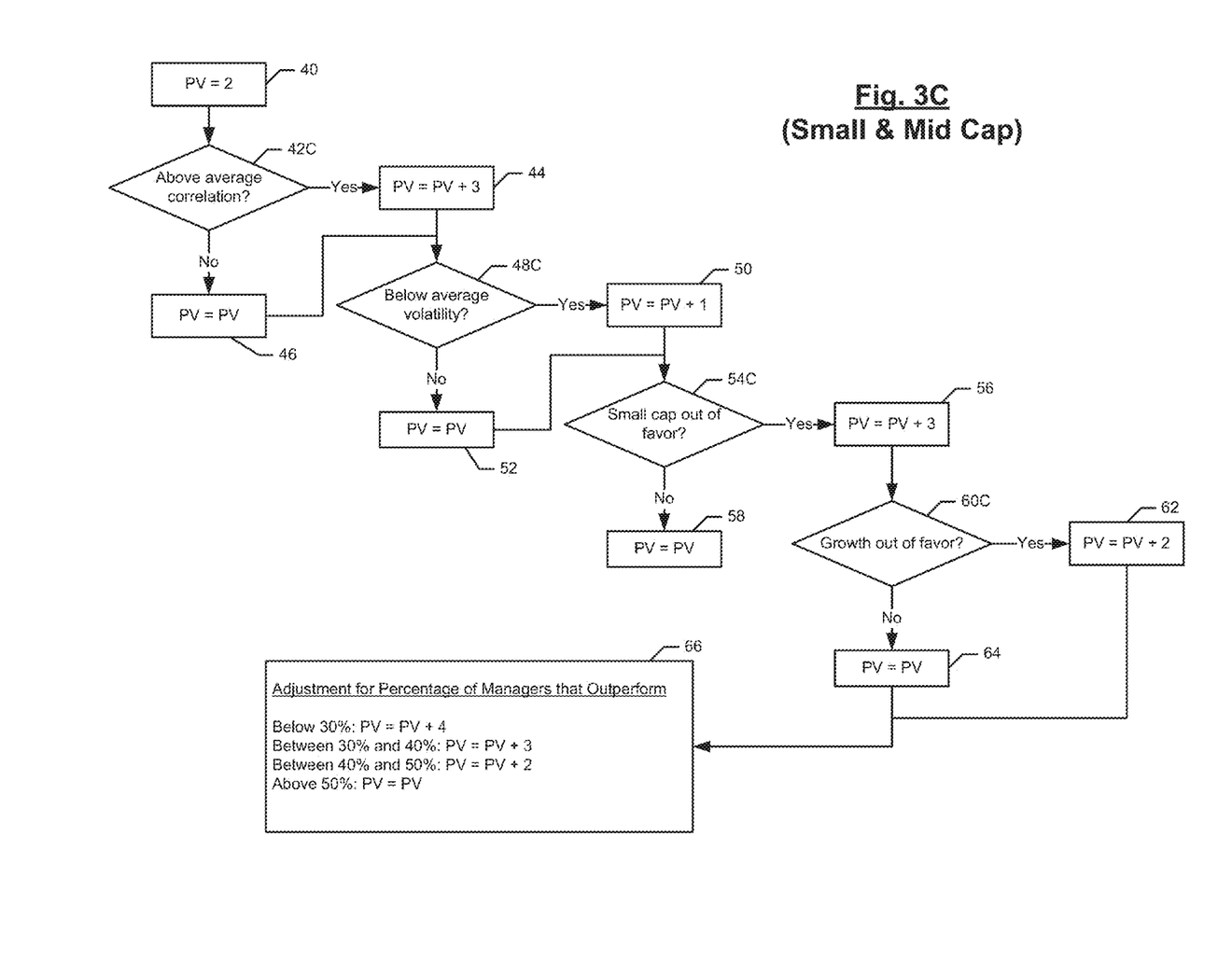
Figure 3D:
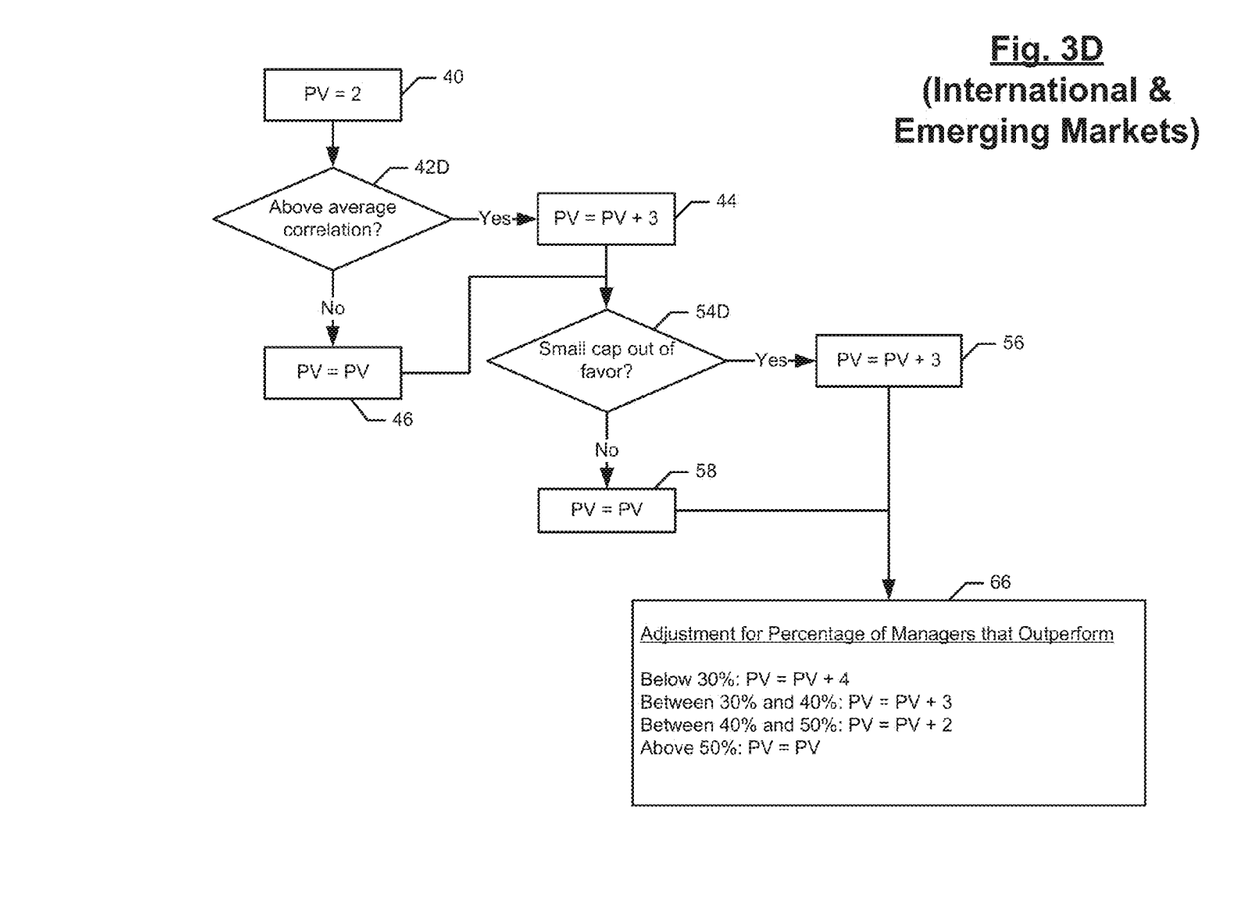

At step 34, a point total may be assigned for each year (or other time period) over which the money managers' performance is being evaluated in the study. The yearly point totals may be different for different investing styles, and the year's investing environment (e.g., whether it was difficult to perform well relative to the benchmark, i.e., an "adverse" market). In general, in various embodiments, factors that have been found empirically to make an investing environment more difficult, or adverse, for a particular type of investing style are used to compute the point values; for each factor that is present in a given year, the point value for that year is increased. Various factors that have been found to affect the difficulty in returning alpha are described in "Factors Affecting Active Manager Performance," by Matthew Rizzo, Consulting Group Investment Advisor Research, Morgan Stanley Smith Barney LLC, May 1, 2012, which is incorporated herein by reference in its entirety. FIGS. 3A-D diagram the process flow for step 34 according to various embodiments, where the process flows in FIGS. 3A-D are for different groups of investing styles. FIG. 3A shows a process for large and multi cap value and core funds; FIG. 3B shows a process for large and multi cap growth funds; FIG. 3C shows a process for small and mid cap funds; and FIG. 3D shows a process for both international and emerging markets. The processes shown in FIGS. 3A-D are for one year. The processes can be repeated for each year in the study so that there is a point total for each year.

In various embodiments, each year has a minimum point total (PV) of two (2), regardless of the type of fund. Thus, in the examples of FIGS. 3A-D, each process starts at step 40, where the point total is initially assigned a value of two (2). From there, points may be added depending on the year's investing environment and circumstances. For example, as shown in the example of FIG. 3A (for large and multi cap value and core funds), if there was above average correlation during the year (step 42A), then the PV is increased by three (3) points (step 44); if there was not above average correlation, there is no increase in PV (step 46). The correlation here can be the correlation between the average, rolling, one-year industry sector (e.g., GIC sectors) returns and the overall market return (e.g., the return of the relevant benchmark index). The average correlation can be determined as the arithmetic mean of the correlations over a multi-year period (e.g., 20 years).

Next, at step 48A, if there was below average return volatility during the year, the year's PV is increased by an additional one (1) point (step 50); if there was not below average volatility there is no additional points awarded for the year (step 52). Volatility here can be measured by the VIX index according to various embodiments. The average volatility can be determined as the arithmetic mean of the VIX index over a multi-year period (e.g., 20 years).

Next, at step 54A, if small cap funds are out of favor during the year, an additional three (3) points are awarded to the year's point total (step 56); if small cap is not out of favor then no additional points are awarded (step 58). The favor of small cap can be a factor in assessing the point value of a year because the inventors have noticed that large cap growth active managers have tended to have significantly smaller weighted market capitalizations relative to large cap growth indexes. As a result, large cap growth managers have enjoyed performance tailwinds in years when smaller cap stocks have outperformed and headwinds when smaller cap stocks underperformed. In contrast, large cap value active managers (see FIG. 3B) have had highly variable weighted market capitalizations over time, but on average have had weighted market capitalizations about equal to those of large cap value indexes. As a result, large cap value manager relative performance has been affected by the relative performance of small cap stocks, but the effect has been variable over time and less impactful compared to the growth manager universe. In one embodiment, "in favor" means that a relevant small cap benchmark return (e.g., the Russell 2000) exceeded a relevant large cap benchmark return (e.g., the Russell 1000) for the year.

Next, at step 60A, if value funds are in favor during the year, an additional two (2) points are awarded to the year's point total (step 62); if value funds are not in favor during the year, then no additional points are awarded (step 64). Again, in one embodiment, "in favor" here means that the value benchmark return (e.g., the Russell 1000 Value) exceeded the relevant growth benchmark return (e.g., the Russell 1000 Growth) for the year.

Finally, at step 66 point total adjustments can be made based on the percentage of managers that outperform the relevant benchmark index (e.g., the Russell 100 Value index for large cap value, etc.). In one embodiment, as shown in FIG. 3A, an additional four (4) points are award to the year's point total if less than 30% of the managers outperformed the benchmark; three (3) points are awarded if between 30% and 39.99% (inclusive) outperformed the benchmark; two (2) points are awarded if between 40% and 49.99% (inclusive) outperformed the benchmark; and no (0) points are awarded if 50% or more of the managers exceeded the benchmark. As can be seen, this step suggests that a relatively more adverse investing environment exists when fewer managers outperform the benchmark. Also as can be seen in FIG. 3A, the maximum possible point total in the illustrated embodiment is 15 points and the minimum is 2 points. Of course, in other embodiments different point ranges may be used. Also, different factors for awarding points (e.g., steps 42A, 48A, 54A, 60A and 66) may be used, although as mentioned above the factors that are used preferably are factors that have been found to affect performance or that are indicative of an adverse investing environment for the investing style at issue. Also, more or fewer factors could be used. Also, the points awarded for the presence of a particular factor can be difference in different embodiments. Also, the thresholds (e.g., steps 42A, 48A, 54A, 60A and 66) could be different in different embodiments.

FIG. 3B shows an illustrative process for scoring the years for large and multi cap growth funds. The process shown in FIG. 3B is similar to that shown in FIG. 3A, except that at step 48B, an additional point is awarded if there is above average volatility (as opposed to if there is below average volatility at step 48A in FIG. 3A). Also, at steps 60B and 62 an additional three points are awarded if growth is in favor for the year (as opposed to steps 60A and 62 in FIG. 3A where two points are awarded if value is in favor).

FIG. 3C shows an illustrative process for scoring the years for small and mid cap funds. The process shown in FIG. 3C is also similar to that shown in FIG. 3A, except that at steps 60C and 62 an additional three points are awarded if growth is out favor in comparison to value for the year based on the returns of the relevant benchmarks (compare to steps 60A and 62 in FIG. 3A where two points are awarded if value is in favor).

FIG. 3D shows an illustrative process for scoring the years for international and emerging market funds. The process shown in FIG. 3D is similar to that shown in FIG. 3A, except that the process of FIG. 3D omits the volatility factor (step 48A in FIG. 3A) and omits the factor as to whether value (or growth) is in favor (steps 60A-C in FIGS. 3A-C).

As can be seen by comparing FIGS. 3A-D, the available points can be different for different types of investing styles, and the factors that are used to award points can be different for the different types of investing styles. Also, the number of factors that are considered in awarding points can be different for the different types of funds. Further, the points awarded for the presence of a particular factor can be different for different types of funds, and the thresholds (e.g., steps 42A-D, 48A-C, 54A-D, 60A-C and 66) could be different for different types of funds. Also, in the embodiments described above several fund styles were grouped together (e.g., FIG. 3A is large and multi cap value and core). In other embodiments, the styles could be grouped differently for the processes of determining the yearly point values. For example, large cap value could have a different process than multi cap value, etc. This may be warranted where, for example, it is determined that different factors affect performance for the different investing styles.

Figure 4:
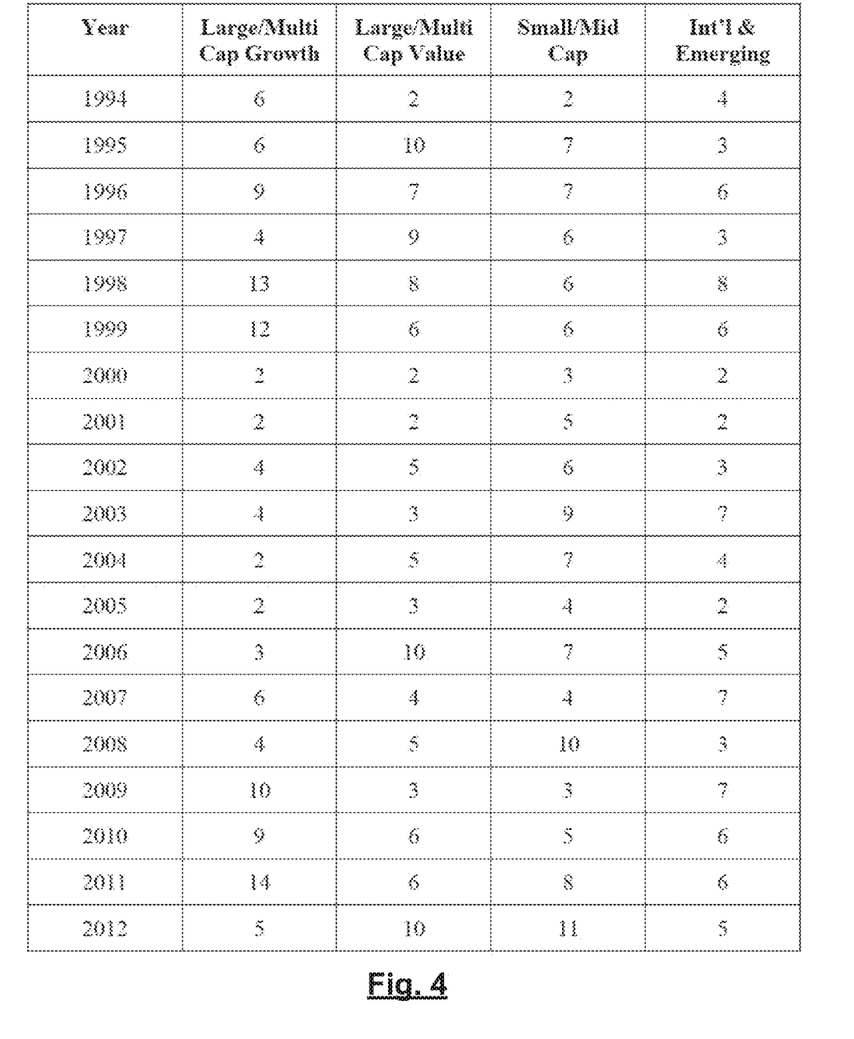
FIG. 4 is a table show the point totals for various years according to various embodiments of the present invention.

FIG. 4 is a table showing the yearly point totals as computed using the illustrative processes shown in FIGS. 3A-D for the four investing style groups described above. The yearly point totals are computed by the processor 16 of the computer device 14 by executing the code of the AAA ranking software module 20 and based on the data stored in the data store 12 (see FIG. 1).

Figure 5A:
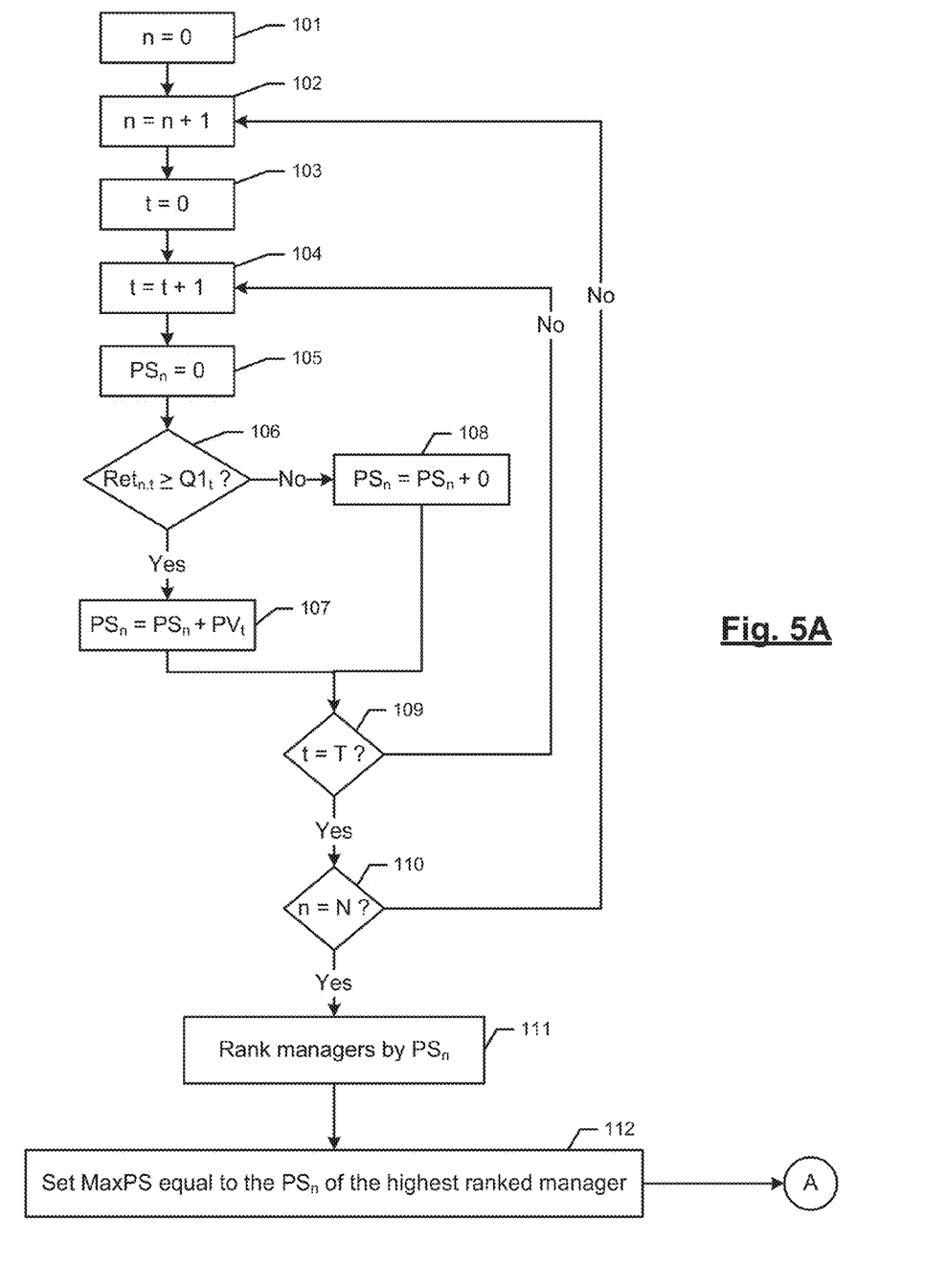
FIGS. 5A-B illustrate a process flow for step 36 of FIG. 2 according to various embodiments of the present invention.
Figure 5B:
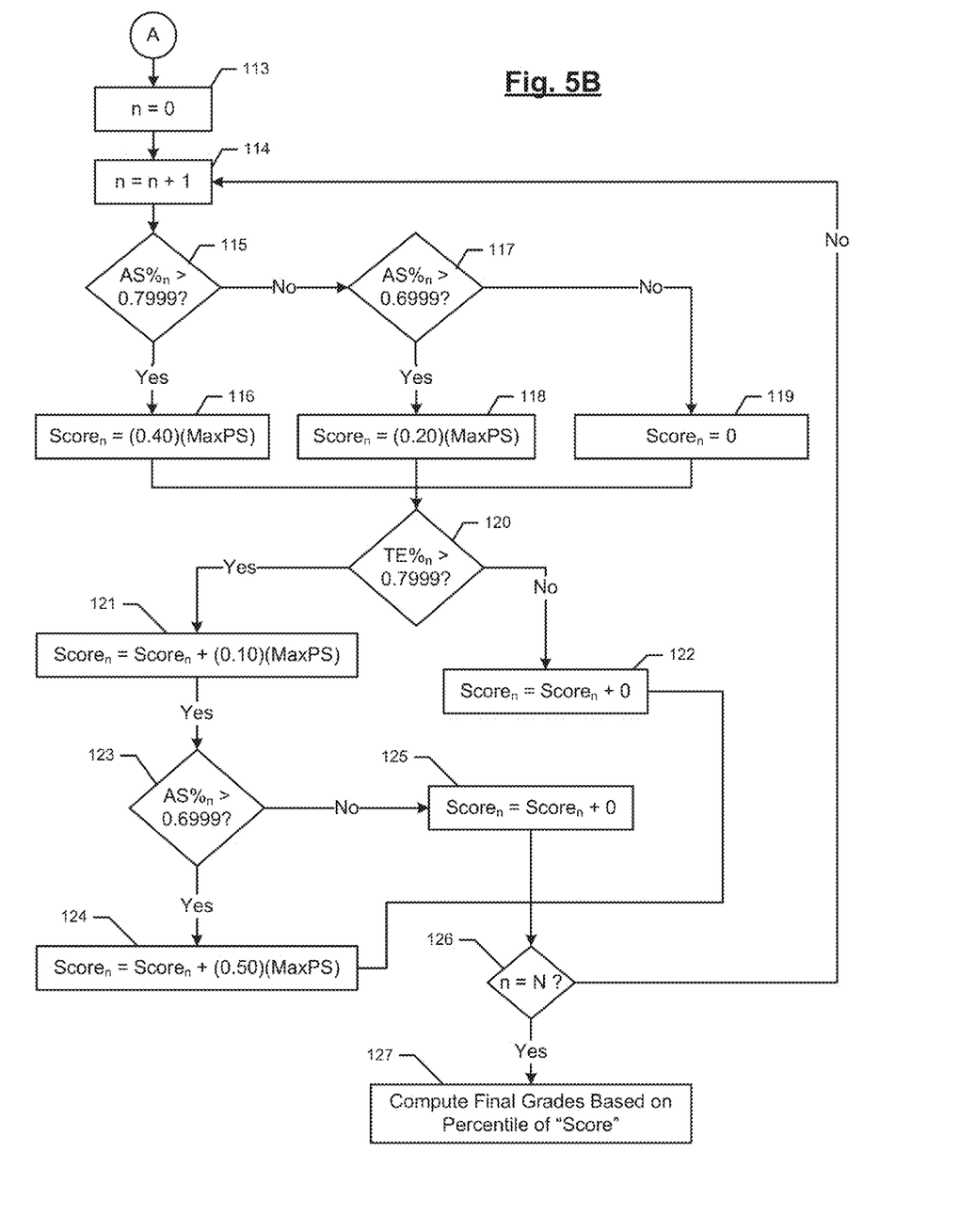

Returning again to FIG. 2, at step 36 the scores and grades for the money managers are computed based on their active share score percentiles (step 31), their tracking error score percentiles (step 33), and the yearly point totals (step 34). FIGS. 5A-B show a process according to various embodiments of the present invention for computing the scores and grades for the money managers. Before describing FIGS. 5A-B, however, it should be noted that steps 30, 32 and 34 are shown side-by-side in FIG. 2 because they can be performed in any order or at the same time. Further, steps 30-34 could be performed prior to commencement of step 36 as shown in FIG. 2; alternatively one or more of steps 30-34 could be performed at the time their computations are needed in step 36, which will be apparent from the description below.

The process of FIGS. 5A-B is performed by the processor 16 of the computer device 14 by executing the code of the AAA ranking software module 20 and based on the data stored in the data store 12 (see FIG. 1). The first general part of the process of FIG. 5A is to compute the cumulative yearly points that each money manager receives across all of the years in the study. Assume that there are n=1, ..., N money managers and t=1, ..., T years in the study. Thus, in various embodiments, loops for the managers and years in order to compute the money managers cumulative yearly point totals are started at steps 101, 102, 103 and 104. Next, at step 105, the cumulative yearly point total for manager n, denoted $PS_n$, is set to zero. Next, at step 106 it is determined whether the return for manager n in year t, denoted $Ret_{n,t}$, is within the top quartile of all of the money managers (or some subset of manager) for year t, denoted $Q1_t$. If so, at step 107, the manager n gets the yearly point total for the year for the manager's class, denoted $PV_t$ in FIG. 5A. For example, referring to FIG. 4, for year 2012, if the manager was in the large/multi-cap growth fund class and was in the top quartile returns for 2012, the manager would receive the 5 points; if the manager was in the large/multi cap value fund class, the examiner would receive 10 points; etc. Alternatively, if the money manager is not in the top quartile, the money manager receives no yearly points at step 108. In other embodiments, other quantiles can be used at step 106 to determine whether the money manager receives the points for year t. At steps 109 the inner loop for the years t is cycled through, and at step 110 the outer loop for the managers n is cycled through, so that the cumulative yearly point total for all of the N managers is computed across the t years.

Once the cumulative yearly point totals for each manager have been computed, at step 111 the managers are ranked by their cumulative yearly point total. And at step 112 the cumulative yearly point score of the manager with the highest yearly point score is selected as a baseline total for use in subsequent steps, shown in FIG. 5B. The cumulative yearly point total of the manager with the highest yearly point total is denoted as MaxPS in FIGS. 5A-B.

The remainder of the process is shown in FIG. 5B. Once the baseline (MaxPS) is determined, the scores and grades for each manager can be determined using the baseline. So at steps 113 and 114, a loop for computing the score for each manager is set up. Next, at step 115, it is determined whether the active share percentile of manager n (see step 31 of FIG. 2), denoted AS $%_n$ in FIG. 5B, is within the top quintile (or some other quantile). If manager n's active share percentile is in the top quintile (e.g., greater than 0.7999), then at step 116 manager n's overall score, denoted $Score_n$, is at least 40% of MaxPS; that is, the money manager is awarded 40% of MaxPS (or 0.40×MaxPS). Alternatively, if manager n's active share score is in the top 30 percentile at step 117, manager n's overall score is at least 20% of MaxPS (or 0.20×MaxPS) at step 118. If manager n's active share is not in the top 30 percentile, manager n gets no points based on his/her active share score at step 119.

Next, the money managers with good (i.e., low) tracking error scores are awarded points. This may be done, for example, by, at step 120, evaluating the money managers' tracking error scores and if a manager has sufficiently high tracking error score percentile, the money manager's overall point score is increased by a fraction of the baseline total (e.g., MaxPS). Since a lower tracking score is better, the managers' tracking error scores could be ranked in ascending order to determine the percentile (see step 33 of FIG. 2); those with relatively low tracking error scores will be in the higher percentiles. In the example of FIG. 5B, if at step 120 the money manager's tracking error score percentile (denoted TE $%_n$) is within the top 20 percentile (e.g., TE $%_n$>0.7999), the money manager's overall score is increased by 10% of MaxPS (or 0.10×MaxPS) at step 121. Another way to do this, rather than ranking the scores in ascending order, is to use a percent rank spreadsheet function (or other similar spreadsheet function) and award points to money managers who have a sufficiently low percent rank value. If the money manager does not have a good tracking error score, at step 122 the money manager's score is not increased because of his/her tracking error score.

In various embodiments, a money manager gets additional points if he/she has both a high active share score and a low tracking error score. Accordingly, from steps 120 and 121 (which evaluate the money manager's tracking error score percentile), the process can proceed to step 123 to assess if the money manager's active share score is also sufficiently high to warrant additional points. In this example, if the money manager's active share score is in the top 30 percentile (e.g., AS $\%_n$>0.6999), then at step 124 the money manager is awarded fifty percent of the MaxPS points. If not, at step 125, the money manager is not awarded any additional points (i.e., the money manager just gets the points from step 121).

Step 126 completes the loop for the money managers so that the score for each of the N money managers is computed. Once the scores for all of the money managers have been computed, final grades may be determined for the money managers at step 127. In various embodiments, the money managers are awarded letter grades based on percentiles for their overall score (from steps 112, 124 or 125, as the case may be). For example, in one embodiment, as shown in Table 2 below, money managers whose overall score is in the top twenty percentile get an A grade, and so on.

TABLE 2

| Grade | Percentile Range |
|---|---|
| A | 80 to 100 |
| B | 60 to 79 |
| C | 40 to 59 |
| D | 20 to 39 |
| F | 0 to 19 |

Of course in other embodiments, different grading schemes for bucketizing the money managers' scores into grades can be used, and different types of grades can be used (e.g., non-letter grades).

It should be noted that in the illustrated embodiment, the maximum possible score for a money manager is 100% of the baseline score (here, MaxPS), by getting 40% of the MaxPS score at step 116, 10% of the MaxPS score at step 121, and 50% of the MaxPS score at step 124. In other embodiments, maximum scores above or below the MaxPS score could be used. Also, a different baseline value used to compute the money manager's scores in steps 115 to 125. For example, the baseline could be a scaled version of the highest ranking money manager's cumulative yearly point total; or some other percentile score could be used as the baseline instead of the highest score; or some average score could be used (e.g., the average of the top ten money managers). Also, different thresholds for achieving points based on the money manager's active share and tracking error scores may be used at steps 115, 117, 120 and 123. In addition, different fractions of the baseline (e.g., MaxPS) could be used at steps 116, 118, 121, and 124. All of these permutations are within the scope of the present invention unless otherwise noted.

The embodiment shown in FIGS. 2-5 reward money managers who have both a high active share score and a relatively low tracking error score. Because of this, the money managers' scores and/or grades can be used to identify active money managers with the ability to outperform indexes and peers. The grading system rewards examiners that are active, but not taking outsized factor bets, such as large sector or industry bets, and that have some degree of style consistency. Generally, the combination of high active share and low tracking error is a fairly rare occurrence, but may point toward managers with good stock-picking skills. The money managers' scores and/or grades can then be used as a factor (along with other potential factors) by an investor in determining with which money manager(s) to invest.

In various embodiments, therefore, the present invention is directed to computer systems and methods for grading active money managers based on their ability to outperform relevant indexes and peer money managers on a going forward basis. The computer system may comprise a data store that stores data about the money managers and at least one processor in communication with the data store. The at least one processor is programmed to compute scores for the money managers based on the data stored in the data store, wherein the scores are computed based on data for multiple successive time periods. The at least one processor computes the scores by performing steps that comprise: (i) computing, based at least on data stored in the data store, a baseline point total that is computed based on a point total for each of the time periods for each of the one or more investing categories, where the point totals for the time periods are based on the presence of factors in the time periods indicative of difficulty for money managers to outperform relative to (e.g., in terms of return) a relevant benchmark index for the money managers, where the relevant benchmark indexes for the money managers are based on the investing categories for the money managers; and (ii) computing, based at least on data stored in the data store, the scores for the money managers by awarding fractions of the baseline point total to each money manager. The fractions of the baseline point total may be award based on at least two metrics: (a) a first metric for the money manager indicative of how closely the money manager's investments match constituents of the relevant benchmark index for the money manager; and (b) a second metric for the money manager metric indicative of how closely the money manager's return is to the relevant benchmark index for the money manager.

In various implementations, the point totals for each of the time periods for each of the one or more investing categories are also computed based on the data stored in the data store. Also, grades may be computed for the money managers based on the scores computed for the money managers. The grade may be based on percentiles of the scores for the money managers.

In various implementations, the first metric comprises an active share score and the second metric comprises a tracking error score. In such a case, the scores for the money managers are computed based on a ranking of the money managers' active share scores and tracking error scores. In particular, the scores for the money managers may be computed such that a money manager receives a greater score when the money manager has both a relatively high active share score and a relatively low tracking error score than if the money manager has either a relatively low active share score or a relatively high tracking error score.

In various implementations, any number of factors may be used for computing the point totals for each of the time periods (e.g., years). For example:

Points may be awarded based on a correlation between industry sector returns and an overall market return for the time period;

Points may be awarded based on market volatility for the time period;

Points may be awarded based on a percentage of the money managers that outperform their relevant benchmark index for the time period; and/or Points may be awarded based on whether a certain investing category is in favor during the time period.

In various embodiments, the process for computing the baseline point total may comprise the step of, for each money manager, for each time period, determining whether a return for the money manager for the time period was within a threshold top quantile of the money managers, where the money manager is awarded the point total for the time period for the money manager's investing category when the money manager's return for the time period was within the threshold top quantile of the money managers. The method may also comprise the steps of determining one or more money managers with a greatest cumulative point total and setting the baseline point total to the cumulative point total of the one or more managers with the greatest cumulative point total.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, SSDs or hard disk drives. A computer-readable medium may also include memory storage that is physical, virtual, permanent, temporary, semipermanent, and/or semitemporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for grading active money managers for potential relative performance, wherein the money managers are classified into one or more investing categories based on the money managers' investing styles, the computer system comprising:

a data store that stores data about the money managers; and at least one processor in communication with the data store, wherein the at least one processor is programmed to compute scores for the money managers based on the data stored in the data store, wherein the scores are computed based on data for multiple successive time periods, and where the at least one processor computes the scores by performing steps that comprise:

computing, based at least on data stored in the data store, a baseline point total that is computed based on a point total for each of the time periods for each of the one or more investing categories, wherein the point totals for the time periods are based on levels of two or more return-related statistical measures in the time periods indicative of an adverse environment for money managers to have returns that outperform a return of a relevant benchmark index for the money managers, wherein the relevant benchmark indexes for the money managers are based on the investing categories for the money managers, wherein computing the baseline point total comprises:

computing a cumulative point total for each money manager based on the returns of the money managers over the time periods; and setting the baseline point total to the cumulative point total of the one or more money managers with the greatest cumulative point total; and computing, based at least on data stored in the data store, the scores for the money managers by awarding fractions of the baseline point total to each money manager based on:

a percentile ranking of the money manager for a first metric among the other money managers, wherein the first metric is indicative of how closely the money manager's investments match constituents of the relevant benchmark index for the money manager; and a percentile ranking of the money manager for a second metric among the other money managers, wherein the second metric is indicative of how closely the money manager's return is to the relevant benchmark index for the money manager.

2. The computer system of claim 1, wherein the steps performed by the at least one processor further comprising computing, based at least on data stored in the data store, the point totals for each of the time periods for each of the one or more investing categories.

3. The computer system of claim 1, wherein the steps performed by the at least one processor further comprising computing grades for the money managers based on the scores computed for the money managers.

4. The computer system of claim 3, wherein the grades are based on percentiles of the scores for the money managers.

5. The computer system of claim 1, wherein:

the first metric comprises an active share score and the second metric comprises a tracking error score; and the at least one processor is programmed to compute the scores for the money managers based on the percentile ranking of the money managers' active share scores and tracking error scores.

6. The computer system of claim 5, wherein the at least one processor is programmed to compute the scores for the money managers such that a money manager receives a greater score when the money manager has both a relatively high active share score and a relatively low tracking error score than if the money manager has either a relatively low active share score or a relatively high tracking error score.

7. The computer system of claim 2, wherein the time periods are years.

8. The computer system of claim 2, wherein the two or more return-related statistical measures comprise at least one of:

a first statistical measure based on a correlation between industry sector returns and an overall market return for the time period;

a second statistical measure based on market volatility for the time period;

a third statistical measure based on a percentage of the money managers that outperform their relevant benchmark index for the time period; and a fourth statistical measure based on whether a certain investing category is in favor during the time period.

9. The computer system of claim 8, wherein computing the baseline point total comprises:

for each money manager, for each time period, determining whether a return for the money manager for the time period was within a threshold top quantile of the money managers, wherein the money manager is awarded the point total for the time period for the money manager's investing category when the money manager's return for the time period was within the threshold top quantile of the money managers;

determining one or more money managers with a greatest cumulative point total; and setting the baseline point total to the cumulative point total of the one or more managers with the greatest cumulative point total.

10. The computer system of claim 1, further comprising a memory unit in communication with the at least one processor, wherein the memory unit comprises a money manager ranking software module that, when executed by the at least one processor, causes the at least one processor to compute the scores for the money managers.

11. A computer-implemented method for grading active money managers for potential relative performance, wherein the money managers are classified into one or more investing categories based on their investing styles, the method comprising:

storing, in a data store, data about the money managers;

computing, by at least one programmed processor that is in communication with the data store, based at least on data stored in the data store, a baseline point total that is computed based on a point total for each of the time periods for each of the one or more investing categories, wherein the point totals for the time periods are based on levels of two or more return-related statistical measures in the time periods indicative of an adverse environment for money managers to have returns that outperform a return of a relevant benchmark index for the money managers, wherein the relevant benchmark indexes for the money managers are based on the investing categories for the money managers, wherein computing the baseline point total comprises:

computing a cumulative point total for each money manager based on the returns of the money managers over the time periods; and setting the baseline point total to the cumulative point total of the one or more money managers with the greatest cumulative point total; and computing, by the least one programmed processor, based at least on data stored in the data store, the scores for the money managers by awarding fractions of the baseline point total to each money manager based on:

a percentile ranking of the money manager for a first metric among the other money managers, wherein the first metric is indicative of how closely the money manager's investments match constituents of the relevant benchmark index for the money manager; and a percentile ranking of the money manager for a second metric among the other money managers, wherein the second metric is indicative of how closely the money manager's return is to the relevant benchmark index for the money manager.

12. The method of claim 11, further comprising computing, by the least one programmed processor, based at least on data stored in the data store, the point totals for each of the time periods for each of the one or more investing categories.

13. The method of claim 11, further comprising computing, by the least one programmed processor, grades for the money managers based on the scores computed for the money managers.

14. The method of claim 13, wherein the grades are based on percentiles of the scores for the money managers.

15. The method of claim 11, wherein:
the first metric comprises an active share score and the second metric comprises a tracking error score; and
computing the scores for the money managers comprises computing the scores for the money managers based on the percentile ranking of the money managers' active share scores and tracking error scores.

16. The method of claim 15, wherein computing the scores for the money managers comprises computing the scores for the money managers such that a money manager receives a greater score when the money manager has both a relatively high active share score and a relatively low tracking error score than if the money manager has either a relatively low active share score or a relatively high tracking error score.

17. The method of claim 12, wherein the two or more return-related statistical measures comprise at least one of:
a first statistical measure based on a correlation between industry sector returns and an overall market return for the time period;
a second statistical measure based on market volatility for the time period;
a third statistical measure based on a percentage of the money managers that outperform their relevant benchmark index for the time period; and
a fourth statistical measure based on whether a certain investing category is in favor during the time period.

18. The method of claim 17, wherein computing the baseline point total comprises:
for each money manager, for each time period, determining whether a return for the money manager for the time period was within a threshold top quantile of the money managers, wherein the money manager is awarded the point total for the time period for the money manager's investing category when the money manager's return for the time period was within the threshold top quantile of the money managers;
determining one or more money managers with a greatest cumulative point total; and
setting the baseline point total to the cumulative point total of the one or more managers with the greatest cumulative point total.

19. The method of claim 11, further comprising using the scores for the money managers to determine with which of the money managers to invest.

20. A computer system for grading active money managers for potential relative performance, wherein the money managers are classified into one or more investing categories based on the money managers' investing styles, the computer system comprising:
a data store that stores data about the money managers; and
at least one processor in communication with the data store, wherein the at least one processor is programmed to compute scores for the money managers based on the data stored in the data store, wherein the scores are computed based on data for multiple successive time periods, and where the at least one processor computes the scores by performing steps that comprise:
computing, based at least on data stored in the data store, a baseline point total that is computed based on a point total for each of the time periods for each of the one or more investing categories, wherein the point totals for the time periods are based on levels of two or more return-related statistical measures in the time periods indicative of an adverse environment for money managers to have returns that outperform a return of a relevant benchmark index for the money managers, wherein the relevant benchmark indexes for the money managers are based on the investing categories for the money managers, wherein computing the baseline point total comprises:
computing a cumulative point total for each money manager based on the returns of the money managers over the time periods; and
setting the baseline point total to the cumulative point total of the one or more money managers with the greatest cumulative point total; and
computing, based at least on data stored in the data store, the scores for the money managers by awarding fractions of the baseline point total to each money manager based on:
an active share score for the money manager that is indicative of how closely the money manager's investments match constituents of a relevant benchmark index for the money manager, wherein the relevant benchmark index for the money manager is based on the money manager's investing category; and
a tracking error score for the money manager that is indicative of how closely the money manager's return is to the relevant benchmark index for the money manager.

21. The computer system of claim 20, wherein computing the scores for the money managers based the active share scores and the tracking error scores comprises awarding fractions of the baseline point total to each money manager based on:
a percentile ranking of the money manager's active share score among the other money managers; and
a percentile ranking of the money manager's active share score among the other money managers.

22. The computer system of claim 21, wherein the at least one processor is programmed to compute the scores for the money managers such that a money manager receives a greater score when the money manager has both a relatively high active share score and a relatively low tracking error score than if the money manager has either a relatively low active share score or a relatively high tracking error score.

23. The computer system of claim 22, wherein the two one or more return-related statistical measures comprise at least one of:
a first statistical measure based on a correlation between industry sector returns and an overall market return for the time period;
a second statistical measure based on market volatility for the time period;
a third statistical measure based on a percentage of the money managers that outperform their relevant benchmark index for the time period; and a fourth statistical measure based on whether a certain investing category is in favor during the time period.

24. The computer system of claim 23, wherein computing the baseline point total further comprises:
for each money manager, for each time period, determining whether a return for the money manager for the time period was within a threshold top quantile of the money managers, wherein the money manager is awarded the point total for the time period for the money manager's investing category when the money manager's return for the time period was within the threshold top quantile of the money managers;
determining one or more money managers with a greatest cumulative point total; and
setting the baseline point total to the cumulative point total of the one or more managers with the greatest cumulative point total.

* * * * *